United States Patent
Buchanan, Jr.

(10) Patent No.: US 6,742,827 B1
(45) Date of Patent: Jun. 1, 2004

(54) PLUG-N-PLAY MODULE WITH INTEGRAL MOTOR CONNECTOR

(75) Inventor: Harry C. Buchanan, Jr., Dayton, OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/306,443

(22) Filed: Nov. 27, 2002

(51) Int. Cl.⁷ .................................................. B60J 1/20
(52) U.S. Cl. .................................. 296/96.15; 15/250.27
(58) Field of Search ........................... 296/96.15, 96.17; 15/250.27, 250.2, 250.3, 250.31; 403/549

(56) References Cited

U.S. PATENT DOCUMENTS

| | | |
|---|---|---|
| 4,736,487 A | 4/1988 | Epple et al. |
| 4,765,018 A | 8/1988 | Buchanan, Jr. |
| 5,050,442 A | 9/1991 | Reed |
| 5,179,759 A | 1/1993 | Epple et al. |
| 5,179,760 A | 1/1993 | Abe |
| 5,222,706 A * | 6/1993 | Hoshino ................ 15/250.31 |
| 5,261,286 A * | 11/1993 | Hayashi ................ 15/250.3 |
| 5,349,717 A | 9/1994 | Patterson et al. |
| 5,396,681 A * | 3/1995 | Hara ................ 15/250.31 |
| 5,441,227 A * | 8/1995 | Hayashi ................ 15/250.31 |
| 5,609,329 A | 3/1997 | Scholl |
| 5,735,015 A | 4/1998 | Yoshida et al. |
| 5,820,286 A | 10/1998 | Karl et al. |
| 5,823,065 A | 10/1998 | Egner-Walter |
| 5,894,627 A | 4/1999 | Irikura |
| 6,000,092 A | 12/1999 | Irikura |
| 6,094,772 A | 8/2000 | West |
| 6,099,195 A | 8/2000 | Egner-Walter |
| 6,148,470 A | 11/2000 | Buchanan, Jr. et al. |
| 6,168,223 B1 | 1/2001 | Egner-Walter |
| 6,364,570 B1 | 4/2002 | Egner-Walter |
| 6,381,800 B1 | 5/2002 | Buchanan, Jr. et al. |
| 6,393,653 B1 | 5/2002 | Harris et al. |
| 6,510,580 B1 * | 1/2003 | Saitou ................ 296/96.17 |

FOREIGN PATENT DOCUMENTS

| | | |
|---|---|---|
| DE | 195 38 424 A1 | 12/1994 |
| EP | 0 458 376 A2 | 11/1991 |
| EP | 0 722 866 A2 | 7/1996 |
| EP | 0 950 586 A3 | 3/1999 |

* cited by examiner

*Primary Examiner*—Jason Morrow
(74) *Attorney, Agent, or Firm*—J. Gordon Lewis

(57) ABSTRACT

A windshield wiper system mounting apparatus includes at least one communication grommet. Each communication grommet can include at least one electrical connection and/or at least one fluid connection, such that the electrical and/or fluid connection is accomplished as a result of the mounting the windshield wiper system to motor vehicle body. The mounting apparatus can also include at least one mounting grommet. Each mounting grommet can include a plug-n-play grommet, a fastener grommet, and/or a bayonet grommet. The combination of the communication and mounting grommets connect the mounting apparatus to a support wall associated with the vehicle body in a simplified manner, while simultaneously performing electrical and/or fluid connections.

26 Claims, 3 Drawing Sheets

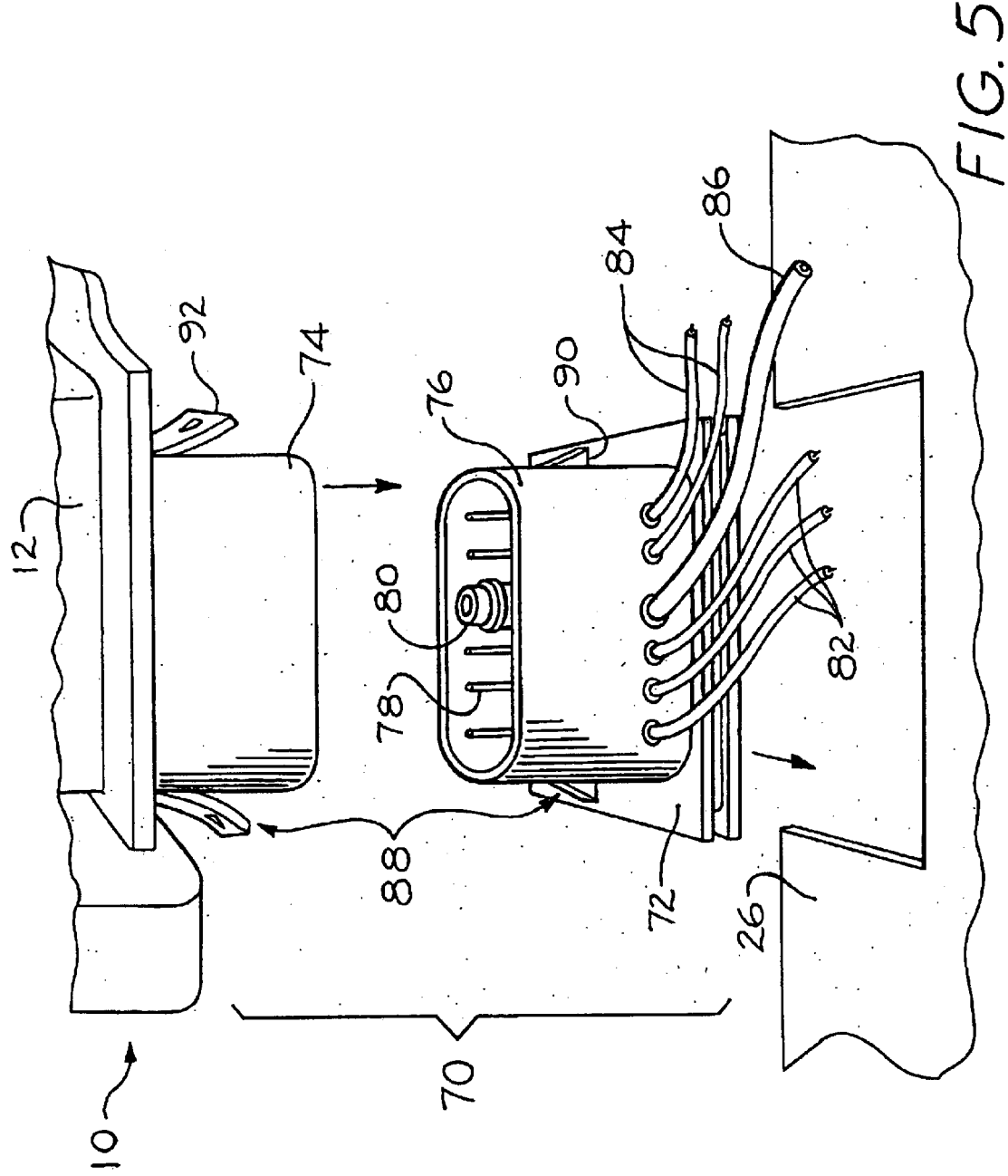

PLUG-N-PLAY MODULE WITH INTEGRAL MOTOR CONNECTOR

FIELD OF THE INVENTION

The present invention relates to an attachment device for a windshield wiper system for motor vehicles.

BACKGROUND OF THE INVENTION

Current plug-n-play module attachment devices mount the windshield wiper drive motor to the vehicle body, but generally are not sufficiently rigid for a high load system. As a result, wipe pattern growth can be seen over the life of the product. Additionally, it would be desirable to reduce the potential for disassembly of the plug-n-play attachment from the vehicle mounting positions. Furthermore, it would be desirable to provide at least one electrical and/or fluid connection to the wiper drive and/or windshield washer pump motor, and/or to the windshield washer nozzles, through the mounting connection, so that separate connections are not required to complete the assembly.

An attachment device is known for a windshield wiper arrangement for motor vehicles with a non-screw type mounting. The attachment device has a support element carrying a windshield wiper drive device with two lateral plug-in pegs located parallel to one another and protruding in the same direction diagonally with respect to wiper shafts mounted on the device. These plug-in pegs, together with a third plug-in peg, are located respectively on corner points of a triangle, where the third plug-in peg extends in a vertical plane perpendicular to the two other plug-in pegs.

SUMMARY OF THE INVENTION

Currently, wiper modules are attached with three fasteners, or two fasteners and a bayonet grommet. The present invention can include an attachment referred to as a plug-n-play module including barbed grommets and tenons in place of at least some fasteners for attachment of the wiper module. The present invention can include an attachment module with at least one plug-n-play or bayonet grommet, at least one fastener grommet, and at least one integral communication connector. The present invention allows for the simplification of assembly by using only one fastener, while minimizing wipe pattern growth over the life of the windshield wiper system. The present invention reduces the potential for unintentional disassembly of the windshield wiper system mounting device from the motor vehicle by preventing the plug-n-play grommet or bayonet grommet from dislodging from the vehicle mounting point. The present invention reduces cost of assembly by connecting electrical and/or fluid connections simultaneously, while assembling the mounting connections to the vehicle body.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 5 is a detailed perspective view of an integral communication connector according to the present invention for simultaneously connecting electrical and/or fluid connectors while assembling a mounting connector to the vehicle body.

DESCRIPTION OF THE PREFERRED EMBODIMENT

Figure 1:
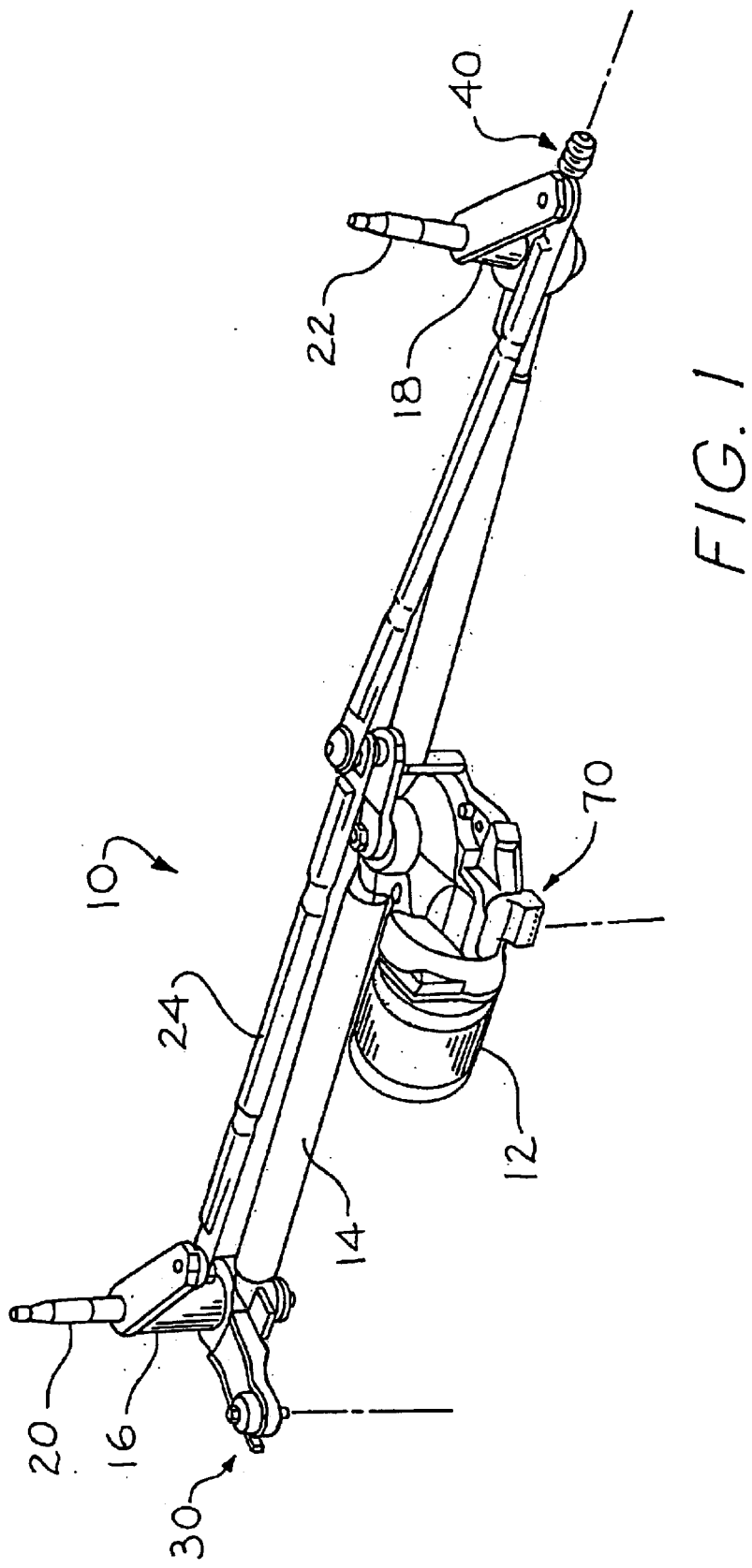
FIG. 1 is a perspective view of a windshield wiper system mounting apparatus according to the present invention.

A windshield wiper system mounting apparatus 10 for motor vehicles is illustrated in perspective view in FIG. 1. The mounting apparatus 10 can include a windshield wiper drive 12 premounted thereon. A support member 14 of the mounting apparatus 10 carries bearing elements 16, 18 at opposite ends for rotatably supporting corresponding wiper shafts 20, 22 in an axially secured manner. Coupling links 24 extend between the windshield wiper drive 12 and a corresponding crank arm connected to each of the wiper shafts 20, 22. The coupling links 24 transfer rotational motion of the crank arm of the wiper drive unit 12 into synchronized oscillatory movement of the wiper shafts 20, 22. The mounting apparatus 10 according to the present invention is connectible to a support wall 26 associated with the vehicle body. The mounting apparatus 10 according to the present invention permits the rotational axes of the wiper shafts 20, 22 to be properly positioned with respect to a windshield to be wiped associated with the vehicle body. The present invention includes at least one mounting grommet and at least one communication grommet. The mounting grommet can be in the form of a fastener grommet 30, a plug-n-play grommet 40, and/or a bayonet grommet 60.

Figure 2:
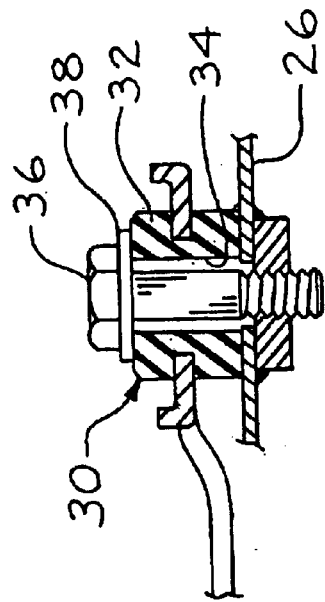
FIG. 2 is a detailed cross-sectional view of a fastener grommet attachment according to the present invention.

Referring now to FIG. 2, the mounting apparatus 10 according to the present invention can include a fastener grommet 30. The fastener grommet 30 can include a vibration dampening portion 32 and an aperture 34 defining a passage for a threaded fastener 36. The threaded portion of the fastener 36 is engagable with internally threaded attachment bores formed in the support wall 26 associated with the vehicle body. A rigid shell 38, such as a metallic washer portion and/or a cylindrical sleeve portion can be associated with the aperture. A typical example of a fastener grommet 30, by way of example and not limitation, can be seen in U.S. Pat. No. 5,609,329 which is incorporated by reference herein in its entirety. The fastener grommet 30 can be located adjacent one end of the elongate support member 14.

Figure 3:
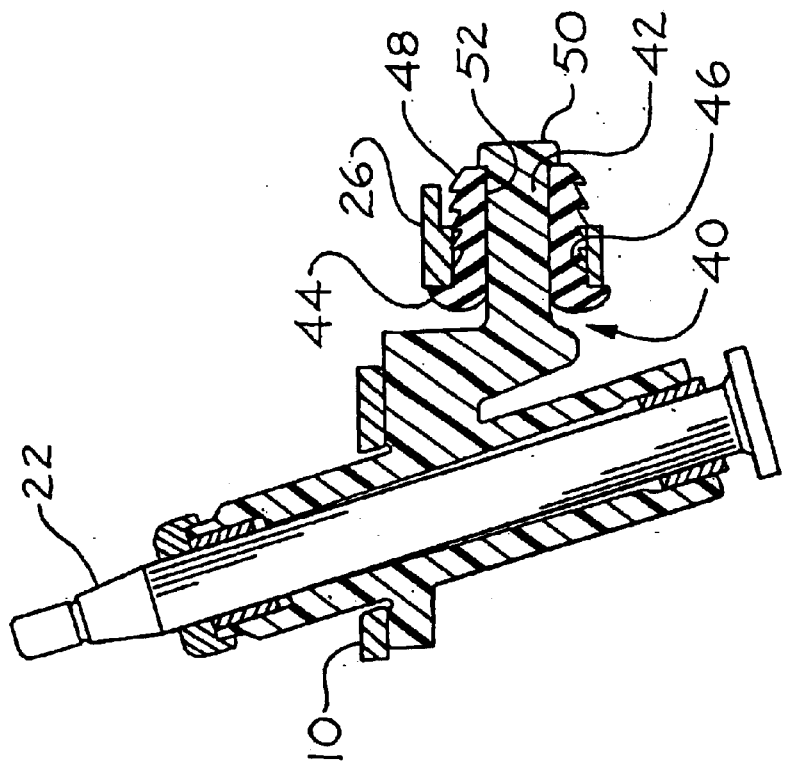
FIG. 3 is a detailed cross-sectional view of a plug-n-play grommet assembly according to the present invention.

Referring now to FIG. 3, the mounting apparatus 10 according to the present invention can include a plug-n-play grommet 40 or bayonet grommet 60. The plug-n-play grommet 40 can be located adjacent an end of the support member 14 opposite from the fastener grommet 30. The longitudinally extending insertion axis of the plug-n-play grommet 40 preferably extends in a non-parallel direction with respect to the longitudinal insertion or rotational axis of the fastener 36, if in the form of a threaded fastener. In the illustrated embodiment, the longitudinal insertion axis of the plug-n-play grommet 40 extends in a direction generally perpendicular with respect to a longitudinally extending insertion axis or rotational axis of the fastener 36. The fastener 36 and the plug-n-play grommet 40 are generally located at or adjacent opposite ends of the support member 14. The plug-n-play grommet 40 includes a tenon/pivot projection 42. An isolation, vibration dampening grommet 44 can be premounted on the projection 42, or mounted in an opening 46 formed in the support wall 26 associated with the vehicle body. The isolation grommet 44 can include outwardly extending barbs 48 to maintain the grommet 44 within the opening 46 formed in the support wall 26 after insertion. If the isolation grommet 44 is prepositioned on the projection 42, the projection 42 can include an enlarged head portion 50 for maintaining the grommet 44 in the installed position with respect to the projection 42. The grommet 44 can include an aperture 52 for receiving the projection 42 therein. When installed within the opening 46 formed in the support wall 26 associated with the vehicle body, the grommet 44 is in a compressed state in areas between the projection 42 and the surface defining the opening 46 in the support wall 26.

Figure 4:
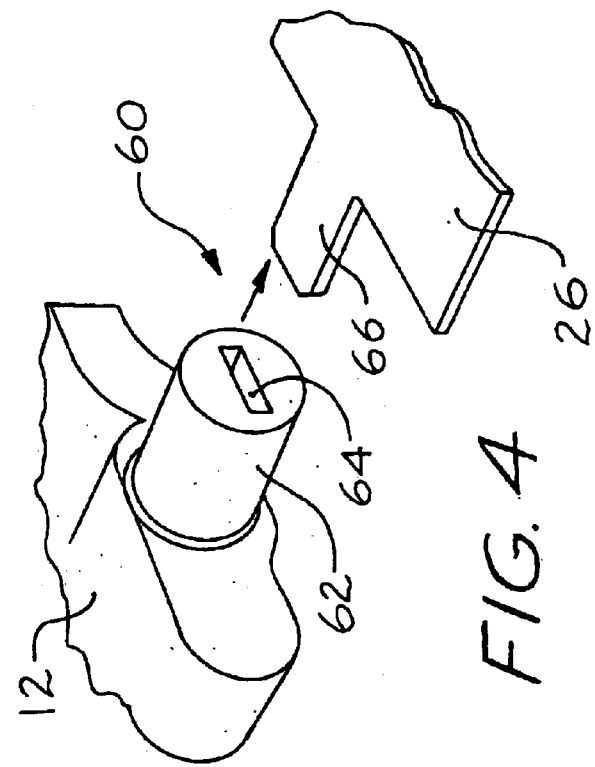
FIG. 4 is a detailed cross-sectional view of a bayonet grommet attachment according to the present invention.

Referring now to FIG. 4, the mounting apparatus 10 according to the present invention can include a bayonet grommet 60 in addition to, or in place of, the plug-n-play grommet 30. The bayonet grommet 60 forms a connection with the support wall 26 associated with the vehicle body using complementary male and female portions. The complementary male and female portions can be mounted on either of the mounting apparatus 10 and support wall 26. The bayonet grommet 60 preferably includes a vibration dampening portion 62. The vibration dampening portion 62 can be preassembled to the mounting apparatus 10 or the support wall 26 associated with the vehicle body. By way of example and not limitation, the illustrated embodiment of FIG. 4. shows a bayonet grommet 60 having an aperture 64 formed through a vibration dampening material portion 62 for receiving a projection 66 associated with the support wall 26 of the vehicle body. The bayonet grommet 60 includes a longitudinally extending insertion axis separate and independent from the longitudinally extending insertion axis of the fastener for engagement through the fastener grommet. The insertion axis of the bayonet grommet 60 preferably extends in a non parallel relationship with respect to the longitudinal insertion axis of the fastener 36. The longitudinal insertion axis of the bayonet grommet 60 preferably extends in a direction generally perpendicular with respect to the longitudinal insertion axis of the inserted portion of the fastener 36, either in the form of a threaded portion or in the form of a post portion for receiving a push on locking washer.

Referring now to FIG. 5, the mounting apparatus 10 according to the present invention can include at least one communication grommet 70. The communication grommet 70 can include a vibration dampening portion 72. The communication grommet 70 forms a connection with the support wall 26 associated with the vehicle body using complementary male and female portions. The complementary male and female portions can be mounted on either of the mounting apparatus 10 and support wall 26 respectively. By way of example and not limitation, the illustrated embodiment of FIG. 5 shows a communication grommet 70 having a male portion 74 connected to the mounting apparatus 10. The male portion 74 can be connected to the wiper drive 12 or support member 14. The female portion 76 can be associated with the vibration dampening portion 72 for connection to the support wall 26 associated with the vehicle body. The female portion 76 can include at least one of an electrical connector 78 and a fluid connector 80. Complementary electrical and/or fluid connectors are disposed within the male portion 74 of the communication grommet 70. By way of example and not limitation, the illustrated embodiment of FIG. 5 shows a communication grommet 70 having electrical connections 82 to the wiper drive 12, electrical connections 84 to the windshield washer pump motor, and a fluid connector 86 for fluid communication between the windshield washer nozzles and the fluid delivered from the windshield washer pump. The communication grommet 70 can include locking means 88 for locking the male and female portions in an engaged position with respect to one another. The locking means 88 can include at least one outwardly extending projection 90 formed on the outer surface of the female portion and a complementary resilient flexible tab 92 operably engagable with the projection 90 for holding the male and female portions in an engaged position. The tab 92 can be moved between an engaged, locked position, and a disengaged, released position with respect to the projection 90.

The plug-n-play module with integral motor connector according to the present invention combines the motor electrical connector with one of the mounting grommets to define a communication grommet. The present invention allows the installation of the windshield wiper mounting apparatus at the automobile assembly manufacturing plant to also insure that the electrical connection and electrical infrastructure are completed at the same time. The communication grommet according to the present invention can also include a washer system connection to the assembly, effectively adding both the washer system control and a level sensing to the wiper controls mounted on the motor. The fluid connection according to the present invention provides a snap fit connection for a leak free assembly. The electrical and/or fluid connection is capable of small motions to ensure vibration isolation of the mounting apparatus from the vehicle body.

In operation, the mounting apparatus 10 according to the present invention allows easy installation of the windshield wiper system with respect to the support wall 26 associated with the vehicle body. The plug-n-play grommet 40, or bayonet grommet 60, is insertable with respect to the corresponding structure formed in the support wall 26 associated with the vehicle body. The plug-n-play grommet 40, or bayonet grommet 60, allows sufficient pivotal and longitudinal movement to align and engage the complementary portions of the communications grommet 70. The fastener 36 can then be aligned with the aperture 34 and the bore formed in the support wall 26 associated with the vehicle body for attachment of the mounting apparatus 10 to the vehicle body. After sufficient tightening of the fastener 36, the mounting apparatus 10 supports the windshield wiper drive 12 and associated wiper shafts 20, 22 in the proper orientation with respect to the windshield to be wiped. Vibration dampening portions at the mounting locations isolate the mounting apparatus 10 according to the present invention from the vehicle body. The present invention allows for the simplification of assembly by using only one fastener, threaded or with push on lock washer, while minimizing wipe pattern growth of the windshield wiper system over the life of the assembly. Additionally, the present invention traps the plug-n-play grommet 40, or bayonet grommet 60, between the support member 44 and the corresponding structure formed in the support wall 26 of the vehicle body.

While the invention has been described in connection with what is presently considered to be the most practical and preferred embodiment, it is to be understood that the invention is not to be limited to the disclosed embodiments but, on the contrary,intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for mounting a windshield wiper system to a motor vehicle comprising:

an elongate support member connectible to a windshield wiper drive;

at least one mounting grommet connectible to the support member and for connecting with respect to the motor vehicle; and at least one communication grommet connectible to the support member, each communication grommet including at least one electrical connection and at least one fluid connection.

2. The apparatus of claim 1 further comprising:

the at least one communication grommet including an electrical connection to the wiper drive.

3. The apparatus of claim 1 further comprising:

the at least one communication grommet including an electrical connection to the windshield washer pump motor.

4. The apparatus of claim 1 further comprising:

the at least one communication grommet including a fluid connection to the windshield washer pump motor.

5. The apparatus of claim 1 further comprising:

the at least one communication grommet including an electrical connection to the wiper drive, an electrical connection to the windshield washer pump motor, and a fluid connection to the windshield washer pump motor.

6. The apparatus of claim 1 further comprising:

each mounting grommet including a vibration dampening portion to be attached with respect to the motor vehicle.

7. The apparatus of claim 1 further comprising:

the at least one mounting grommet selected from the group consisting of a fastener grommet, a bayonet grommet, and a plug-n-play grommet.

8. The apparatus of claim 7 wherein:

the at least one mounting grommet is a plug-n-play grommet located adjacent to one end of the elongate support member.

9. The apparatus of claim 7 wherein:

the at least one mounting grommet is a fastener grommet located adjacent one end of the elongate support member.

10. The apparatus of claim 7 wherein:

the at least one mounting grommet is a plug-n-play grommet and a fastener grommet located adjacent opposite ends of the elongate support member.

11. The apparatus of claim 7 wherein:

the at least one mounting grommet is a plug-n-play grommet including a projection and a vibration dampening grommet, the vibration dampening grommet having an aperture for receiving the projection and outwardly extending barbs for engagement with the motor vehicle.

12. The apparatus of claim 7 wherein:

the at least one mounting grommet is a bayonet grommet having a vibration dampening complementary portion of a male-female connector for engagement with the motor vehicle.

13. The apparatus of claim 7 wherein:

the at least one mounting grommet is a fastener grommet having a vibration dampening portion with an aperture for receiving a fastener therethrough for attaching to the motor vehicle.

14. In an apparatus for mounting a windshield wiper system to a motor vehicle having an elongate support member connectible to a windshield wiper drive, the improvement comprising the combination of:

at least one communication grommet connectable to one of the support member and the wiper drive, each communication grommet including at least one electrical connection and at least one fluid connection such that the at least one electrical and the at least one fluid connection occurs simultaneously during mounting of the elongate support member to the motor vehicle.

15. The improvement of claim 14 further comprising:

the at least one communication grommet including an electrical connection to the wiper drive.

16. The improvement of claim 14 further comprising:

the at least one communication grommet including an electrical connection to the windshield washer pump motor.

17. The improvement of claim 14 further comprising:

the at least one communication grommet including a fluid connection to the windshield washer pump motor.

18. The improvement of claim 14 further comprising:

the at least one communication grommet including an electrical connection to the wiper drive, an electrical connection to the windshield washer pump motor, and a fluid connection to the windshield washer pump motor.

19. The improvement of claim 14 further comprising:

at least one mounting grommet connectible to the elongate support member, each mounting grommet including a vibration dampening portion to be attached with respect to the motor vehicle.

20. The improvement of claim 19 further comprising:

the at least one mounting grommet selected from the group consisting of a fastener grommet, a bayonet grommet, and a plug-n-play grommet.

21. The improvement of claim 20 wherein:

the at least one mounting grommet is a plug-n-play grommet located adjacent to one end of the elongate support member.

22. The improvement of claim 20 wherein:

at least one mounting grommet is a fastener grommet located adjacent one end of the elongate support member.

23. The improvement of claim 20 wherein:

the at least one mounting grommet is a plug-n-play grommet and a fastener grommet located adjacent opposite ends of the elongate support member.

24. The improvement of claim 20 wherein:

the at least one mounting grommet is a plug-n-play grommet including a projection and a vibration dampening grommet, the vibration dampening grommet having an aperture for receiving the projection and outwardly extending barbs for engagement with the motor vehicle.

25. The improvement of claim 20 wherein:

the at least one mounting grommet is a bayonet grommet having a vibration dampening complementary portion of a male-female connector for engagement with the motor vehicle.

26. The improvement of claim 20 wherein:

the at least one mounting grommet is a fastener grommet having a vibration dampening portion with an aperture for receiving a fastener therethrough for attaching to the motor vehicle.

* * * * *